Feb. 4, 1941.    F. W. HARRIS    2,230,293
TRANSMISSION
Filed Feb. 27, 1940    3 Sheets-Sheet 1

INVENTOR
FORD W. HARRIS
BY HARRIS, KIECH, FOSTER & HARRIS
ATTORNEYS.

Feb. 4, 1941.  F. W. HARRIS  2,230,293
TRANSMISSION
Filed Feb. 27, 1940  3 Sheets-Sheet 2

INVENTOR
FORD W. HARRIS
BY HARRIS, KIECH, FOSTER & HARRIS
ATTORNEYS.

Feb. 4, 1941.    F. W. HARRIS    2,230,293
TRANSMISSION
Filed Feb. 27, 1940    3 Sheets-Sheet 3

INVENTOR
FORD W. HARRIS
BY HARRIS, KIECH, FOSTER & HARRIS.
FOR THE FIRM
ATTORNEYS.

Patented Feb. 4, 1941

2,230,293

UNITED STATES PATENT OFFICE 2,230,293

TRANSMISSION

Ford W. Harris, Los Angeles, Calif., assignor to Patco, Inc., Los Angeles, Calif., a corporation of California Application February 27, 1940, Serial No. 321,057

5 Claims. (Cl. 74—217)

My invention relates to means for transmitting power from one rotating shaft or the like to another. The ratio expressed by a fraction, the numerator of which is the speed of rotation of the driving shaft and the denominator of which is the speed of rotation of the driven shaft, is hereby defined as the "transmission ratio."

The principal object of the invention is to provide a power-transmitting means, or "transmission," having two different transmission ratios, hereinafter called, respectively, the "high gear ratio" and the "low gear ratio." The low gear ratio may be three times the high gear ratio or any other prime or fractional multiple of the high gear ratio.

A further object of the invention is to provide a power-transmitting means having two transmission ratios and which will automatically select and maintain the ratio best suited to the load conditions to be met.

As an example of the application of the transmission to one type of load, I have illustrated and will describe how the transmission may be applied to the driving of a small vehicle, like a motorcycle or other small automotive vehicle, by means of an internal combustion engine or other motor, without thereby limiting my claims to this particular application of my invention.

The transmission illustrated and hereinafter described is well suited to driving a small automotive vehicle but can be applied, by modifications well within the skill of one skilled in the art, to the driving of many other classes of loads. As is well known, the great majority of automobiles now in use have a foot-operated clutch which when disengaged entirely disconnects the engine from the driving mechanism of the automobile, thus allowing the motor to "idle" or run without driving the vehicle, and a hand-operated gear shift by which the transmission ratio may be changed while the clutch is disengaged. The operation of such a vehicle requires the use of one hand and one foot to change gears, the other hand being available to control the throttle and the other foot to control the brake.

It is a further object of my invention to provide automatic means for controlling the action of the clutch and the shift in transmission ratio so that the operator need control only the throttle and the brake. This is highly desirable in small vehicles in which the cost of the standard automobile clutch and transmission would be prohibitive and in which simplicity in control is very desirable.

In driving such small automotive vehicles it is highly desirable to use small internal combustion engines burning gasoline as a fuel since these engines have been brought to a high state of perfection. Such engines have the disadvantage that they are not self-starting but must be rotated to start. In the standard type of automobile a small electric motor is provided to start the engine through an automatic starting mechanism, an expedient that would impose certain costs and complications not warranted in small vehicles.

It is a further object of my invention to provide means by which the engine may be started by merely pushing the vehicle forward and by which the engine, when started, does not necessarily tend to drive the vehicle but can run idle, that is, without transmitting power to the vehicle at all speeds below a critical speed, hereinafter called "top idling speed," which, in the case of some small automotive vehicles, can well be about 25% or less of the maximum motor speed.

In general, it is the object of my invention to provide a simple, reliable, and cheap automatic clutch and transmission adapted for use in small automotive vehicles and for other purposes.

Further objects and advantages will be made obvious hereinafter.

In the drawings, which illustrate a transmission well adapted for use in small vehicle propulsion:

Figure 1:
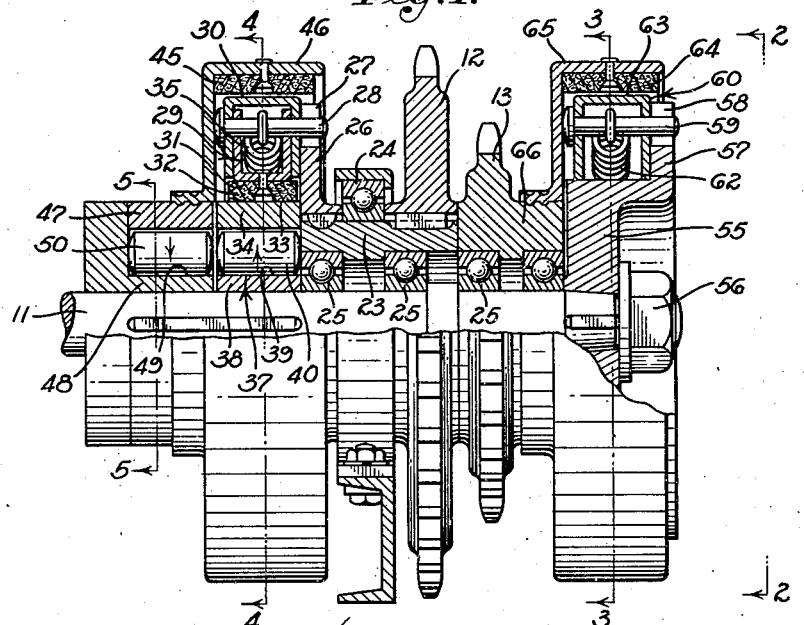
Fig. 1 is an elevation partly in section of one form of my invention.
Figure 6:
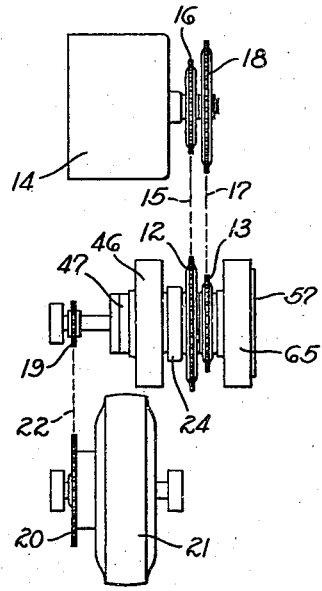
Fig. 6 is a schematic drawing showing the method of applying the mechanism shown in Figs. 1 to 5 to the propulsion of a small vehicle.

My invention may take the form shown in Fig. 1 in which 11 is a driven shaft which it is desired to drive from a low gear sprocket 12 or a high gear sprocket 13. The high gear sprocket 13 rotates at a higher speed than the low gear sprocket 12, both being driven from some source of power. For example, the high gear sprocket 13 may be considered as rotating three times as fast as the low gear sprocket 12. When used with an internal combustion engine 14, as shown in Fig. 6, the sprocket 12 may be driven through a chain 15 from a sprocket 16 and the sprocket 13 may be driven through a chain 17 from a sprocket 18. The sprockets 16 and 18 being keyed or otherwise rigidly secured to the shaft of the engine 14, the relative diameters of the various sprockets are such that the sprocket 13 rotates at some multiple of the revolutions of the sprocket 12. The sprocket 12 may be termed the slow sprocket and the sprocket 13 the fast sprocket. The sprockets 12 and 13 do not, of course, rotate at a constant speed, their speed varying proportionally to the engine speed. This speed is controlled manually by the operator by manipulation of the usual engine throttle, not shown.

The primary problem met by my transmission is to couple the shaft 11 to either the slow sprocket 12 or the fast sprocket 13, but, of course, not at any time to both. Some of the other problems are to do this automatically to meet the speed and load conditions imposed by the particular use to which the invention is applied. The embodiment of my invention shown is well adapted to vehicle propulsion, the shaft 11 carrying a sprocket 19 which drives a sprocket 20 carried on a wheel 21 through a chain 22.

Figure 2:
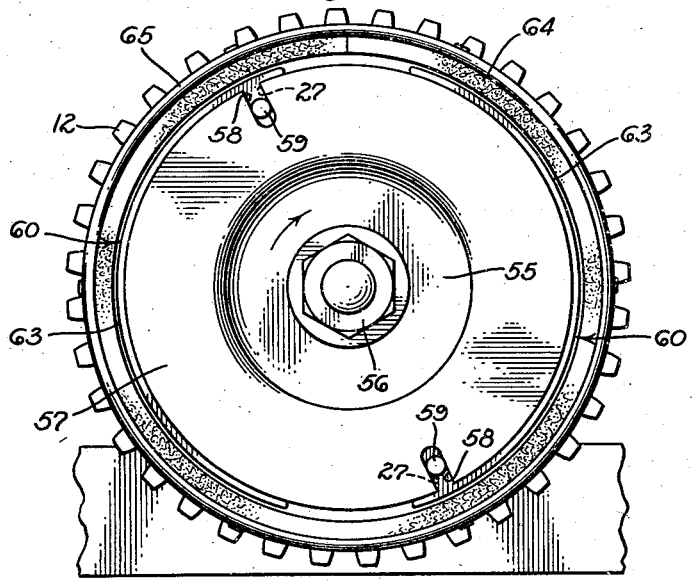
Fig. 2 is an elevation of the mechanism shown in Fig. 1 as seen when viewed in the direction of the arrows 2—2 of Fig. 1.
Figure 4:
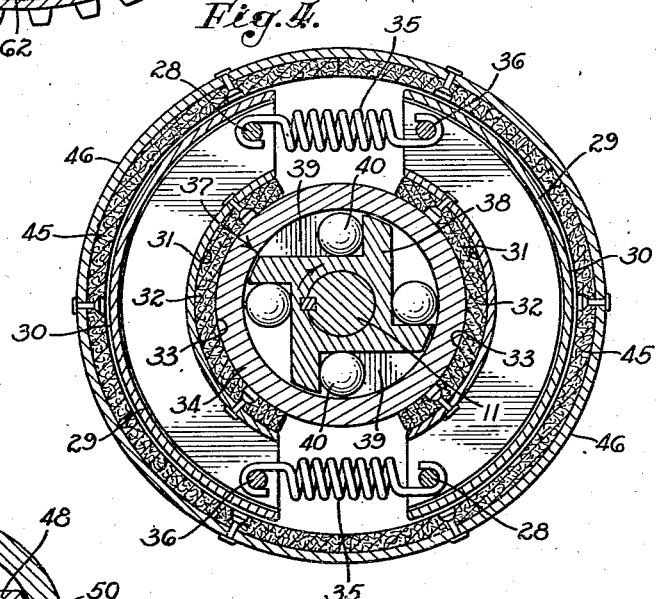
Fig. 4 is a section on a plane represented by the line 4—4 of Fig. 1.

Referring to Fig. 1, it will be seen that the sprocket 12 is keyed or otherwise rigidly secured on a quill 23 which is supported and turns in a ball bearing 24 and which supports ball bearings 25 in which the shaft 11 is free to turn. All the parts normally rotate in the direction of the arrows. Keyed on the quill 23 is a driving plate 26 having two slots 27 formed therein. These slots are similar in position to other slots shown in Fig. 2. Projecting into the slots 27 and free to slide radially therein are two pins 28, each carried in a low gear clutch element 29. Each clutch element 29 is formed of two metal members forming a box section having an outer surface 30 and an inner surface 31. Secured to the inner surface 31 is a clutch facing 32 of a material suited to increase the coefficient of friction on surfaces tending to slide thereon. An inner surface 33 of the clutch facing 32 engages the outer cylindrical surface of a member 34 when the low gear clutch elements 29 are in contracted position. There are two low gear clutch elements 29, as shown in Fig. 4, and they are pulled together with two tension springs 35, each of these springs being attached at one end to one of the pins 28 carried by one of the clutch elements 29 and which also serves to transmit force between the driving plate 26 and the clutch elements 29. Each of the springs 35 is attached at the other end to a pin 36 carried in the other clutch element. The pins 36 do not engage the driving plate 26 and serve merely as points of spring attachment. The springs 35 with the parts at rest hold the clutch elements 29 in frictional engagement with the member 34. The member 34 is a part of an assembly which we may call the negative ratchet 37. This negative ratchet is, in fact, an overrunning clutch and consists of the member 34 which has a cylindrical cavity in which a member 38 is free to rotate. Situated in cavities 39 in the member 38 are four rollers 40. The cavities 39 are shaped as shown in Fig. 4. This form of roller ratchet is well known and has been often used in a manner similar to that in which I use it. If the member 38, which is keyed to the shaft, is rotated in a clockwise direction with the member 34 stationary, as viewed in Fig. 4, one or more of the rollers 40 wedges in its cavity 39 and is forced against and drives the member 34. If, at any time, the member 34 rotates in a clockwise direction faster than the member 38, the rollers 40 are released. The practical effect is that the member 38 can drive the member 34 but the member 34 cannot drive the member 38 if the parts are rotating clockwise as viewed in Fig. 4.

The negative ratchet has two purposes. It allows the motor to be started by pushing the vehicle forward, the motor as soon as it starts releasing the negative ratchet and thereafter running free. It also allows the operator of the vehicle to pull the vehicle backward with the motor idling or at rest without engaging the motor.

The negative ratchet 37 is thrown entirely out of action as soon as the low gear clutch elements 29 are forced outwardly due to centrifugal force caused by their rotation. The clutch elements 29 are held in their retracted position with the clutch facing 32 gripping the outside of the member 34 as long as the low gear clutch elements 29 are rotated below top idling speed. As soon as this speed is exceeded the clutch elements 29 are expanded and forced outwardly by centrifugal force against the action of the springs 35.

When the low gear clutch elements 29 expand they are forced into contact with a strip of clutch facing material 45 secured on the inside of a low gear clutch drum 46 which is rigidly secured to and carried by an outer member 47 of a positive ratchet.

Figure 5:
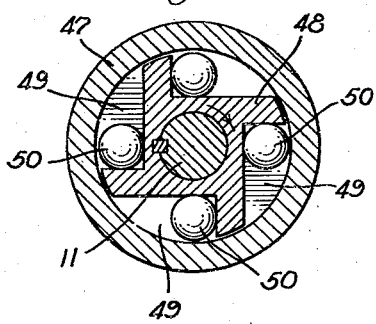
Fig. 5 is a section on a plane represented by the line 5—5 of Fig. 1.

The positive ratchet is similar to the negative ratchet but works in the opposite direction in that the shaft 11 can be driven through the positive ratchet but the shaft 11 cannot drive the mechanism through the positive ratchet. The positive ratchet can best be understood by an inspection of Fig. 5, in which a member 48 is shown keyed or otherwise rigidly secured to the shaft 11. Milled in the outside of the member 48 are cavities 49 in each of which a roller 50 is placed. When the member 47 rotates in a clockwise direction, as viewed in Fig. 5, faster than the member 48, the rollers wedge against the member 47 and the member 48 is driven. When the member 47 rotates more slowly than the member 48, the rollers are released and the positive ratchet ceases to drive the shaft. It will be noted that the negative ratchet 37 is operative only when the low gear clutch is rotating below top idling speed and that above this speed the positive ratchet is operative. As a result, as long as the low gear clutch is not rotating above top idling speed the shaft 11 can drive the motor 14 but the motor cannot drive the shaft. This not only provides means by which the motor can be started by pushing the vehicle forward, but also provides means which prevents "killing" the motor as long as the vehicle is moving, since if the member 34 moves faster than the member 38, the rollers 40 engage and the motor is driven by the vehicle. If therefore, for example, the vehicle is rolling down a hill and the motor is shut off with the low gear clutch rotating below top idling speed, the negative ratchet 37 will drive the motor 14 even if the supply of fuel to the engine is shut off. The same thing, of course, happens as the vehicle is slowed down to stop. As soon as the low clutch starts rotating above top idling speed, the negative ratchet 37 becomes inoperative. The positive ratchet is operative only when the low gear clutch is rotating above top idling speed and then acts as a free-wheeling or over-running clutch. That is, the member 48 attached to the shaft 11 can run faster than the member 47 which is driven at slow speed by the engine. In other words, the engine cannot drive the vehicle with the low gear clutch rotating below top idling speed due to the negative ratchet but drives the vehicle through the positive ratchet at speeds above top idling speed. As long as the engine is driving the vehicle through the low speed clutch and the chain 15, the vehicle is in low gear and the engine is running fast and the vehicle is running slowly.

At a vehicle speed somewhat below the maximum speed attained by the vehicle with the engine running at maximum speed and the vehicle in low gear, this speed being hereinafter called intermediate speed, it is desirable to throw the transmission into high gear and drive the shaft 11 by the chain 17. This is accomplished by a high speed clutch which will now be described.

Figure 3:
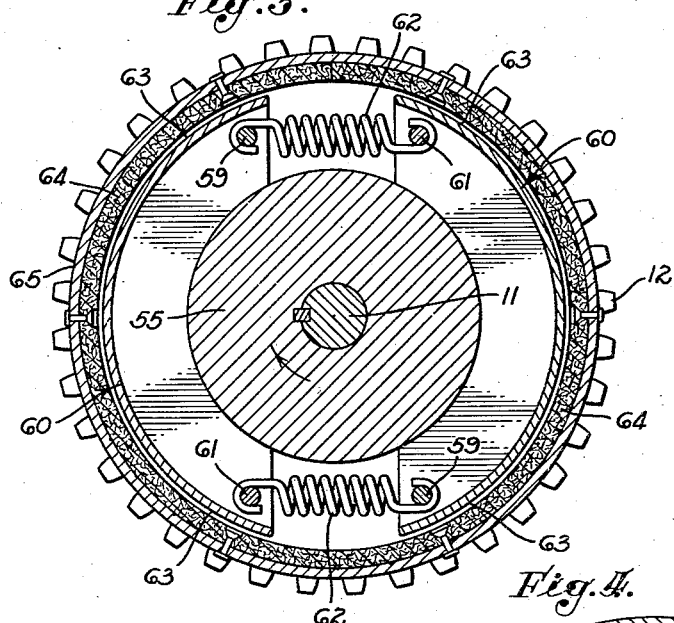
Fig. 3 is a section on a plane represented by the line 3—3 of Fig. 1 as viewed in the direction of the arrows.

The high speed clutch shown in Fig. 1 and Fig. 3 consists of a member 55 which is rigidly keyed to the shaft 11 and held in axial alignment by a nut 56. The member 55 carries a driving plate 57 having two slots 58 placed on the same diameter. Each of the slots 58 is engaged by a pin 59 carried by a high gear clutch element 60. The pins 59 are each in one end of the clutch elements 60, and a pin 61 which does not project into the plate 57 is carried in the other end of each clutch element 60. Tension springs 62 are attached to the pins 59 and 61 and tend to hold the clutch elements 60 in their disengaged or retracted position. The springs 62 are of such strength that they hold the clutch elements 60 in this retracted position until the clutch is rotated at or above intermediate speed. Whenever the clutch is rotated above this speed the clutch elements are forced outwardly by centrifugal force and the outer faces 63 of the clutch elements 60 are forced outwardly against clutch facing 64 carried in a high speed clutch drum 65 which is secured to and carried by a member 66 which carries the fast sprocket 13. When the high speed clutch is engaged the vehicle is in high gear and may be driven at a higher speed than when it is in low gear. The intermediate speed at which the high gear clutch engages is faster than top idling speed. Therefore, when the high speed clutch engages, the low speed clutch is also engaged and remains engaged at all times that the high speed clutch is engaged. When the shaft 11 is driven through the high speed clutch it always rotates faster than the sprocket 12 and the low speed clutch which is connected to and driven thereby. As a result the member 48 of the positive ratchet, which is connected to the shaft 11, rotates faster than the member 47 which is driven through the low speed clutch. As long as the car is in high gear the low speed clutch cannot drive the shaft 11, since the shaft rotates faster than the clutch.

The method of operation is as follows:

The vehicle and engine being at rest, the operator sets the fuel supply of the engine so that the engine will run below top idling speed with no load on engine and, of course, turns on the ignition. If now the vehicle is pushed forward the negative ratchet engages the low speed clutch, being in its retracted position, and the engine is rotated through the chain 15. The engine therefore starts, and as soon as it starts the negative ratchet releases and the engine runs freely without driving the vehicle and continues to idle until the throttle is further opened. If now the operator wishes to start the vehicle, he opens the throttle and thus increases the fuel supply, and as soon as the engine has accelerated above top idling speed the low speed clutch elements, which are at all times connected to the engine through the chain 15, expand and drive the drum 46 and thus drive the vehicle through the positive ratchet. The vehicle is then in low gear and it runs in low gear until it moves above intermediate speed, which may be about one-third of its maximum speed. As soon as the vehicle accelerates above intermediate speed the high speed clutch expands and the vehicle then runs in high gear.

If, while running in high gear, the vehicle starts to ascend a grade and slows down below intermediate speed, the high speed clutch releases and the positive ratchet engages so that the vehicle is driven through the low speed clutch and, being then in low gear, can more easily climb the grade. As soon as the grade is passed and the vehicle, still in low gear, moves above intermediate speed, the high speed clutch again engages and the vehicle is again in high gear.

Whenever it is desired to stop the vehicle, the supply of fuel to the engine is shut off. As soon as the vehicle slows down below intermediate speed, the high speed clutch releases and the vehicle "free wheels" due to the positive ratchet until the engine slows down below top idling speed when the low speed clutch releases. The engine will then be driven through the negative ratchet until the vehicle comes to a full stop. If before the vehicle comes to a full stop the operator opens his throttle, the engine will idle after the vehicle stops. If he leaves the throttle closed, the engine and car stop together.

This transmission is well adapted to driving motorcycles and other light vehicles. It provides an automatic transmission so that the operator of the vehicle can control all its operations by the throttle or fuel supply. He has neither a clutch pedal nor gear shift lever to bother with. Such a small vehicle also does not have to provide space for, or carry the weight of, the parts provided in the standard type of vehicle for controlling and operating the clutch and transmission.

It will be seen that the invention above described and hereinafter claimed accomplishes certain useful results. It provides a two-speed transmission especially adapted for use in driving a light vehicle, although it may be applied to other purposes. When so used, the engine may be started by pushing the vehicle forward and the engine when started can run at all speeds below its top idling speed without driving the vehicle. This end is attained by the use of the negative ratchet.

If, however, the engine is run above top idling, the low speed clutch is automatically expanded by centrifugal force and the engine drives the vehicle at low speed. When, however, the vehicle is driven above a certain speed through the low speed clutch, the high speed clutch automatically engages and the engine can then drive the vehicle at a higher speed. The invention is particularly characterized by the fact that when the high speed clutch is engaged, and during all the time the high speed clutch is engaged, the low speed clutch is also engaged but ineffective due to the positive ratchet.

The high and low speed clutches are, of course, of conventional design and various other well known forms of clutches could readily be substituted therefor. The positive and negative ratchets are also of conventional design and many other forms of ratchet or one-way driving devices could be readily substituted therefor. The method of driving the clutch through two chains 15 and 17 so as to obtain a high speed member such as the sprocket 13 and a low speed member such as the sprocket 12 is merely a convenient expedient useful in a vehicle of this particular type.

Obviously, gears, belt drives, and sprockets and chains, being all well known devices, are mutually mechanically equivalent in combinations such as are claimed herein.

The term "one-way ratchet transmission device" includes all devices through which power may be transmitted from a first rotating body to a second rotating body, but which will not transmit power from said second body to the first. The terms "positive" and "negative" are used for identification purposes.

I claim as my invention:

1. In a vehicle having a driving wheel and a motor from which said wheel may be driven, an automatic transmission through which said motor drives said wheel comprising: a countershaft; any convenient and well-known means through which said countershaft may drive said wheel; a low speed driven sprocket rotating about the center of said countershaft; a low speed member rigidly connected to and rotating with said low speed sprocket; a low speed driving sprocket rigidly secured to and rotating with the shaft of said engine; a low speed chain driving said low speed driven sprocket from said low speed driving sprocket; a high speed driven sprocket rotating about the center of said countershaft; a high speed member rigidly connected to and rotating with said high speed sprocket; a high speed driving sprocket rigidly secured to and rotating with the shaft of said engine; a high speed chain driving said high speed driven sprocket from said high speed driving sprocket, the proportions of the aforesaid high and low speed sprockets being such that said low speed member and said high speed member are rotated at speeds bearing a fixed relationship to the speed of rotation of said engine shaft and said high speed member rotates faster than said low speed member at all times that said engine shaft is rotating; a low speed clutch adapted to automatically couple said countershaft to said low speed member whenever said low speed member is driven above top idling speed; a high speed clutch adapted to automatically couple said high speed member to said countershaft whenever said countershaft is rotated at above an intermediate speed by said low speed clutch, said intermediate speed being such that when said countershaft is rotated at said intermediate speed through said low speed clutch, said low speed member is rotating at a speed considerably above said idling speed; and a positive one-way ratchet transmission device between said countershaft and said low speed clutch, said device being so constructed that said low speed member can drive said countershaft but said countershaft cannot drive said low speed member.

2. In a vehicle having a driving wheel and a motor from which said wheel may be driven, an automatic transmission through which said motor drives said wheel comprising: a countershaft; any convenient and well-known means through which said countershaft may drive said wheel; a low speed driven sprocket rotating about the center of said countershaft; a low speed member rigidly connected to and rotating with said low speed sprocket; a low speed driving sprocket rigidly secured to and rotating with the shaft of said engine; a low speed chain driving said low speed driven sprocket from said low speed driving sprocket; a high speed driven sprocket rotating about the center of said countershaft; a high speed member rigidly connected to and rotating with said high speed sprocket; a high speed driving sprocket rigidly secured to and rotating with the shaft of said engine; a high speed chain driving said high speed driven sprocket from said high speed driving sprocket, the proportions of the aforesaid high and low speed sprockets being such that said low speed member and said high speed member are rotated at speeds bearing a fixed relationship to the speed of rotation of said engine shaft and said high speed member rotates faster than said low speed member at all times that said engine shaft is rotating; a low speed clutch adapted to automatically couple said countershaft to said low speed member due to centrifugal forces generated in the clutch due to its rotation whenever said low speed member is driven above top idling speed; a high speed clutch adapted to automatically couple said high speed member to said countershaft whenever said shaft is rotated at above an intermediate speed by said low speed clutch due to centrifugal forces generated in said high speed clutch due to its rotation, said intermediate speed being such that when said countershaft is rotated at said intermediate speed through said low speed clutch, said low speed member is rotating at a speed considerably above said idling speed; and a positive one-way ratchet transmission device between said countershaft and said low speed clutch, said device being so constructed that said low speed member can drive said countershaft but said countershaft cannot drive said low speed member.

3. In a vehicle having a driving wheel and a motor from which said wheel may be driven, an automatic transmission through which said motor drives said wheel comprising: a countershaft; any convenient and well-known means through which said countershaft may drive said wheel; a low speed driven sprocket rotating about the center of said countershaft; a low speed member rigidly connected to and rotating with said low speed sprocket; a low speed driving sprocket rigidly secured to and rotating with the shaft of said engine; a low speed chain driving said low speed driven sprocket from said low speed driving sprocket; a high speed driven sprocket rotating about the center of said countershaft; a high speed member rigidly connected to and rotating with said high speed sprocket; a high speed driving sprocket rigidly secured to and rotating with the shaft of said engine; a high speed chain driving said high speed driven sprocket from said high speed driving sprocket, the proportions of the aforesaid high and low speed sprockets being such that said low speed member and said high speed member are rotated at speeds bearing a fixed relationship to the speed of rotation of said engine shaft and said high speed member rotates faster than said low speed member at all times that said engine shaft is rotating; a low speed clutch adapted to automatically couple said countershaft to said low speed member whenever said low speed member is driven above top idling speed; a high speed clutch adapted to automatically couple said high speed member to said countershaft whenever said countershaft is rotated at above an intermediate speed by said low speed clutch, said intermediate speed being such that when said countershaft is rotated at said intermediate speed through said low speed clutch, said low speed member is rotating at a speed considerably above said idling speed; and a positive one-way ratchet transmission device between said countershaft and said low speed clutch, said device being so constructed that said low speed member can drive said countershaft but said countershaft cannot drive said low speed member, said countershaft being driven by said low speed member through said positive one-way ratchet transmission device only when said clutch is rotating above idling speed.

4. In a vehicle having a driving wheel and a motor from which said wheel may be driven, an automatic transmission through which said motor drives said wheel comprising: a countershaft; any convenient and well-known means through which said countershaft may drive said wheel; a low speed driven sprocket rotating about the center of said countershaft; a low speed member rigidly connected to and rotating with said low speed sprocket; a low speed driving sprocket rigidly secured to and rotating with the shaft of said engine; a low speed chain driving said low speed driven sprocket from said low speed driving sprocket; a high speed driven sprocket rotating about the center of said countershaft; a high speed member rigidly connected to and rotating with said high speed sprocket; a high speed driving sprocket rigidly secured to and rotating with the shaft of said engine; a high speed chain driving said high speed driven sprocket from said high speed driving sprocket, the proportions of the aforesaid high and low speed sprockets being such that said low speed member and said high speed member are rotated at speeds bearing a fixed relationship to the speed of rotation of said engine shaft and said high speed member rotates faster than said low speed member at all times that said engine shaft is rotating; a low speed clutch adapted to automatically couple said countershaft to said low speed member due to centrifugal forces generated in the clutch due to its rotation whenever said low speed member is driven above top idling speed; a high speed clutch adapted to automatically couple said high speed member to said countershaft whenever said countershaft is rotated at above an intermediate speed by said low speed clutch due to centrifugal forces generated in said high speed clutch due to its rotation, said intermediate speed being such that when said countershaft is rotated at said intermediate speed through said low speed clutch, said low speed member is rotating at a speed considerably above said idling speed; and a positive one-way ratchet transmission device between said countershaft and said low speed clutch, said device being so constructed that said low speed member can drive said countershaft but said countershaft cannot drive said low speed member, said countershaft being driven by said low speed member through said positive one-way ratchet transmission device only when said clutch is rotating above idling speed.

5. In a vehicle having a driving wheel and a motor from which said wheel may be driven, an automatic transmission through which said motor drives said wheel comprising: a countershaft; any convenient and well-known means through which said countershaft may drive said wheel; a low speed driven sprocket rotating about the center of said countershaft; a low speed member rigidly connected to and rotating with said low speed sprocket; a low speed driving sprocket rigidly secured to and rotating with the shaft of said engine; a low speed chain driving said low speed driven sprocket from said low speed driving sprocket; a high speed driven sprocket rotating about the center of said countershaft; a high speed member rigidly connected to and rotating with said high speed sprocket; a high speed driving sprocket rigidly secured to and rotating with the shaft of said engine; a high speed chain driving said high speed driven sprocket from said high speed driving sprocket, the proportions of the aforesaid high and low speed sprockets being such that said low speed member and said high speed member are rotated at speeds bearing a fixed relationship to the speed of rotation of said engine shaft and said high speed member rotates faster than said low speed member at all times that said engine shaft is rotating; a high speed clutch for connecting said high speed member directly to the countershaft so that the countershaft will rotate at the same speed as said high speed member; and a one-way positive ratchet through which said low speed member may drive said countershaft but through which said countershaft cannot drive said member, said low speed clutch being actuated by centrifugal force to connect said low speed member to said countershaft through said positive ratchet whenever said low speed clutch is rotated above top idling speed, and said high speed clutch being actuated by centrifugal force to connect said high speed member to said countershaft whenever said high speed clutch is rotated at a speed considerably faster than the speed at which said low speed clutch engages.

FORD W. HARRIS.